US012625998B2

(12) United States Patent
Balin et al.

(10) Patent No.: US 12,625,998 B2
(45) Date of Patent: May 12, 2026

(54) MANAGING STORAGE SPACE USE IN DISTRIBUTED SYSTEMS

(71) Applicant: Dell Products L.P., Round Rock, TX (US)

(72) Inventors: Maxim Balin, Gan-Yavne (IL); Nechami Maman, Jerusalem (IL); Eric Joseph Bruno, Shirley, NY (US)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 18/930,308

(22) Filed: Oct. 29, 2024

(65) Prior Publication Data

US 2026/0119690 A1     Apr. 30, 2026

(51) Int. Cl.
*G06F 21/62* (2013.01)

(52) U.S. Cl.
CPC ................................ *G06F 21/6218* (2013.01)

(58) Field of Classification Search
CPC ........................... G06F 21/6218; G06F 21/604
See application file for complete search history.

(56) References Cited

U.S. PATENT DOCUMENTS

| | | | | |
|---|---|---|---|---|
| 6,802,029 B2 * | 10/2004 | Shen | ....................... | G06F 21/80 |
| | | | | 714/E11.136 |
| 7,152,148 B2 * | 12/2006 | Williams | .............. | G06F 21/604 |
| | | | | 707/E17.037 |
| 11,126,745 B1 * | 9/2021 | Sankuratripati | ...... | G06F 3/0482 |
| 2009/0214044 A1 * | 8/2009 | Kinoshita | ............. | G06F 21/602 |
| | | | | 713/193 |
| 2017/0147836 A1 * | 5/2017 | Joscelyne | ............. | G06F 21/602 |
| 2019/0155794 A1 * | 5/2019 | Mujumdar | .......... | G06F 16/2452 |
| 2020/0304516 A1 * | 9/2020 | Lazar | .................... | H04L 67/535 |
| 2021/0374000 A1 * | 12/2021 | Chhabra | .............. | H04W 12/10 |
| 2024/0256716 A1 * | 8/2024 | Liu | ......................... | G06F 21/78 |

* cited by examiner

*Primary Examiner* — Ponnoreay Pich

(74) *Attorney, Agent, or Firm* — WOMBLE BOND DICKINSON (US) LLP

(57)     ABSTRACT

Methods and systems for managing operation of a deployment are disclosed. The operation may be managed by selecting, by an inference model, a storage location to write data. To write the data, data access patterns of the data may be ingested by the inference model and a storage location may be selected. The storage location may include a local storage of the data processing system and/or a cloud storage of a management system of the deployment. To read the data, the inference model may perform a first search for the data in the local storage.

However, if metadata is found in the local storage, then the inference model may perform a second search in the cloud storage. If the data is found, then the inference model may read the data.

20 Claims, 8 Drawing Sheets

MANAGING STORAGE SPACE USE IN DISTRIBUTED SYSTEMS

FIELD

Embodiments disclosed herein relate generally to managing operation of a distributed system. More particularly, embodiments disclosed herein relate to managing data in distributed systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
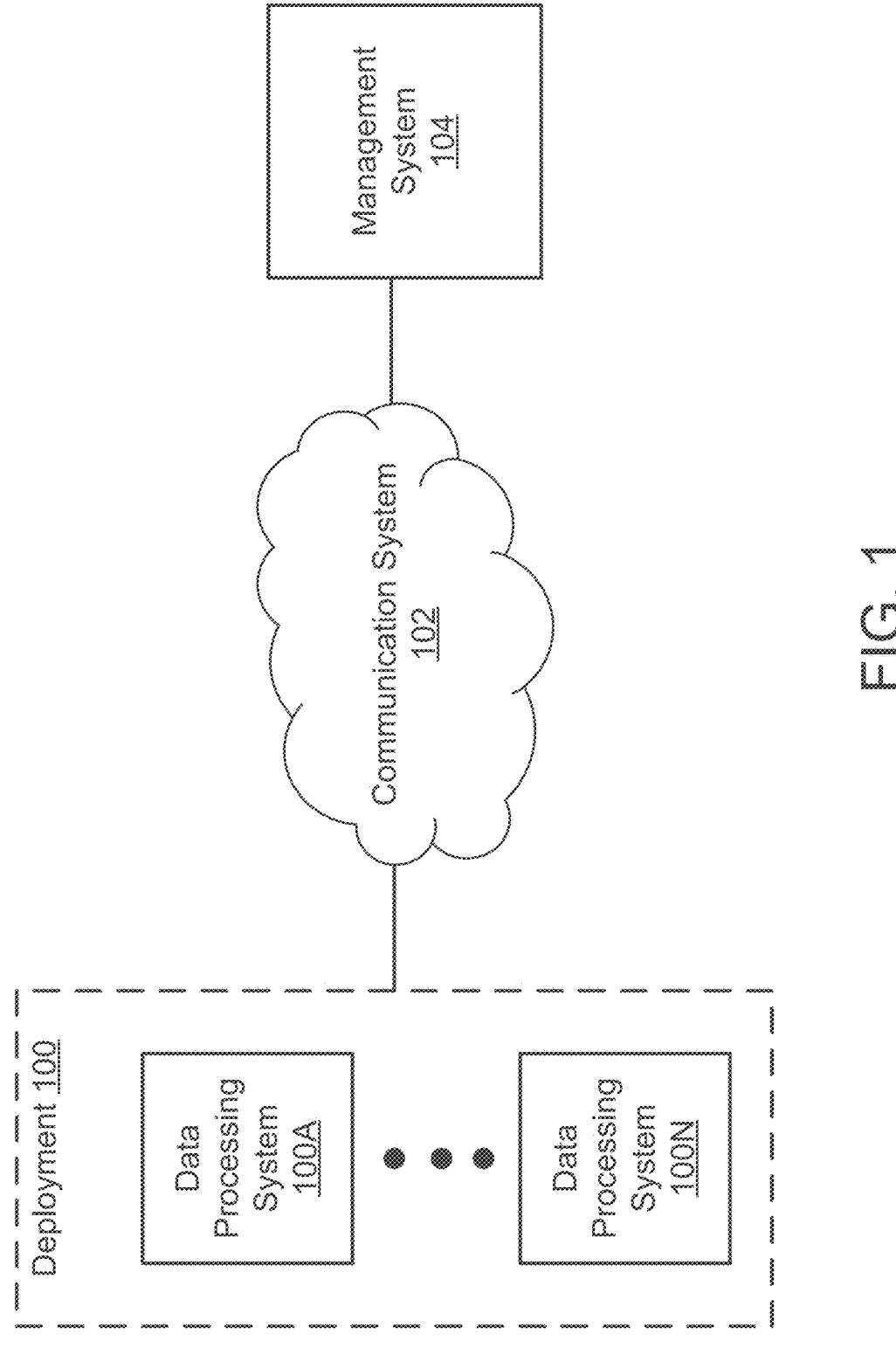
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting.

Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to managing operation of a deployment. The operation may be managed by selecting, based on a data access request, a storage location of data using an inference model. The inference model may be trained perform a read and/or write request using at data access patterns of the data. The data access patterns may include data usage patterns, data characteristics, data priorities, etc. The data usage patterns may include a frequency of accessing the data using at least one application, latency associated with the accessing of the data, etc. The data characteristics may include at least a type of the data, a volume of the data, and/or at least one security protocol by which to secure the data. The data priorities may categorize at least one level of importance of the data associated with an operation by a data processing system.

During a write request, the inference model may obtain, by a data manager, the data from an application. The inference model may ingest the data access patterns from metadata of the data. The inference model may ingest the data access patterns and make a selection, based on the data access patterns, of a storage location. The storage location of storage locations may include local storage of the data processing system and/or cloud storage of a management system of the deployment. Once the storage location has been selected by the inference model, the write of the data may be performed in the storage location by the inference model.

During a read request, the data manager may obtain the data access request. The data manager may ingest the data access request. The inference model may to obtain a first location to search for the data from the data manager. The first search location may be local storage of the data processing system. The inference model may also ingest the first search location from a storage allocation table of the data processing system.

The inference model may perform a first search of the local storage for the data. If the data is not found, then the first search, by the inference model may end. However, if the data is found, then the inference model may transfer, by the data manager, the data to the application.

Further, if, during the first search, metadata of the data is instead found, then the inference model may ingest the metadata. From the metadata, the inference model may extract a pointer to a second location of the data. The second location of the data may be remote storage of the management system. The inference model may perform a second search of the remote storage for the data. Once the data is found, by the inference model, in the remote storage, then the inference model may transfer, by the data manager, the data to the application.

In an embodiment, a method for managing operation of a deployment is disclosed. The method may include: (i) obtaining, by a data manager of a data processing system of the deployment, a data access request, (ii) in a first instance of the obtaining where the data access request is a write request: (a) selecting, by the data manager, a storage location using an inference model, the inference model being based on data usage patterns, data characteristics, and data priority, and (b) storing, by the data manager, a portion of data at the storage location to service the data access request; (iii) in a second instance of the obtaining where the data access request is a read request: (a) reading, by the data manager, a second portion of the data from a second storage location where requested data is believed to be stored, (b) in a first instance of the reading where the second portion of the data is successfully read from the second storage location: (1) providing the second portion of the data to a requestor to service the data access request; (c) in a second instance of the reading where the second portion of the data where metadata is read from the second storage location: (1) identifying, using the metadata, a third storage location; (2) reading a third portion of the data from the third storage location; and (3) providing the third portion of the data to the requestor to service the data access request.

The data usage patterns may include a frequency of accessing the data, at least one time at which the accessing the data occurs, and latency associated with the accessing of the data.

The data characteristics may include a type of the data, a volume of the data, and at least one security protocol by which to secure the data.

The data priority may include a level of importance of the data associated with an operation by the data processing system.

The metadata of the data may include at least a storage location of the data.

The metadata may be stored in a physical block address space of a data storage device that is reserved for the data, the data is not stored in the physical block address space, and performing a read of the physical block address space returns the metadata and not the data.

Selecting, by the data manager, the storage location using the inference model may include: (i) predicting, using the inference model, a quantity of computing resources likely to be used at a future time for accessing, by the data processing system, the portion of the data at the future time; (ii) comparing the quantity to a threshold quantity; (iii) in a first instance of the comparing where the quantity exceeds the threshold quantity: selecting local storage for storage of the portion of the data; and (iv) in a second instance of the comparing where the quantity does not exceed the threshold quantity: selecting remote storage for storage of the portion of the data.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, data may be accessed and/or stored over time. For example, applications may store and access data to provide any of the computer implemented services.

To store the data, various data storage devices (e.g., hard drives, solid state disks, etc.) may be used. Each storage device may be capable of storing a finite amount of data.

However, if storage space provided by the storage devices is unavailable, then the data used in the computer implemented services may not be able to be stored. Additionally, if data is stored remotely, access time limits due to latency, network conditions, etc. may prevent timely storage and/or accessing of data.

In general, embodiments disclosed here relate to systems and methods for managing operation of a deployment. The operation of the deployment may be managed by selectively locally storing data and/or remotely storing data. The data may be selectively stored so that access time expectations are more likely to be met while improving the likelihood that sufficient storage resources are available to store data used in the computer implemented services provided by the deployment, and devices thereof.

To do so, when devices of the deployment receive access requests (e.g., from applications hosted thereby), the devices may perform data management processes that may include determining, from the data access request, whether the write request and/or the read request is being performed. If the write request is being performed, then an inference model may be used to select the storage location to write the data. The inference model may be used by (i) receiving the data from the data access request from the application and (ii) attempting to store the data in the storage location. To store the data, the inference model may determine the storage location.

To be able to determine the storage location, the inference model may be trained first. The inference model may be trained using data access patterns. The inference model may be trained by ingesting a portion of the data access patterns to adjust model weights of the inference model. The inference model may include a decision tree, neural network, support vector machine, etc. The data may include the at least the one portion of the data that has a storage location, for example, in cloud storage.

The data access patterns may include data usage patterns, data characteristics, data priorities, etc. The data usage patterns may include a frequency of accessing the data using at least one application, latency associated with the accessing of the data, etc. The data characteristics may include at least a type of the data, a volume of the data, and/or at least one security protocol by which to secure the data. The data priorities may include at least one level of importance of the data associated with an operation by the data processing system.

To determine the storage location, once the inference model has been trained, the inference model may receive the data from the data access request from the application. The inference model may be used in a data manager, application programming interface (API), and/or a file system of the data processing system.

To receive the data, the data manager, API, and/or the file system may transfer the data from the application to the inference model. The inference model may ingest the data and may make a determination of the storage location based on the data access patterns of the data.

The data access patterns may include data usage patterns, data characteristics, data priorities, etc. The data usage patterns may include a frequency of accessing the data, at least one time at which the accessing the data occurs, latency associated with the accessing of the data, etc. The data characteristics may include at least a type of the data, a volume of the data, and/or at least one security protocol by which to secure the data. The data priorities may categorize at least one level of importance of the data associated with an operation by the data processing system.

If the inference model determines that the data includes the data access patterns such as the high level of importance, the high frequency of accessing the data, a low volume of data, etc., then the inference model may store the data in the local storage of the data processing system. However, if the inference model determines that the data includes the data access patterns such as a low level of importance, a low frequency of accessing the data, a high volume of data, etc. then the inference model may store the data in the cloud storage.

If the read request is being performed, then an inference model may search for the storage location to read the data. The inference model may search for the storage location by accessing a storage allocation table in the file system and/or the API of the data processing system. The storage allocation table may be used to find a location in the local storage of at least one block of storage of the data.

The at least one block of the storage may be stored in the location in the local storage. From the at least one block of the storage, the data may be retrieved by the inference model. Upon retrieval of the data, the inference model may transfer, using the data manager, API, and/or the file system, the data to the application for performance of at least one operation by the application.

The at least one block of the storage in the location in the local storage may include metadata that is stored in place of the data. The metadata may include a storage location, the storage location being specified by a pointer. The pointer may point to a storage location in the cloud storage. The inference model may ingest the pointer and access the location in the cloud storage. Upon accessing the location in the cloud storage, the inference model may perform a read of the at least one block of the storage to retrieve the data. Upon retrieval of the data, the inference model may transfer, by the data manager, API and/or the file system, the data to the application for performance of at least one operation by the application.

To provide the above noted functionality, the system may include deployment 100, and management system 104. Each of these components is discussed below.

Deployment 100 may include any number of data processing system 100A-100N. The any number of data processing system 100A-100N may include an application which may perform a data access request for data. The data access request may be performed by an inference model that has been embedded in a data manager, application programming interface (API) and/or a file system of the any number of data processing system 100A-100N.

In the data manager, API, and/or the file system, the inference model may ingest the data access request. The inference model may determine that the data access request is a write request. If the data access request is a write request, the data may be included in the data access request.

The inference model may ingest the data and make a determination to where to write the data based on data attributes of the data. If the inference model determines that the data includes data access patterns such as the high level of importance, the high frequency of accessing the data, a low volume of data, etc., then the inference model may store the data in local storage of the any number of data processing system 100A-100N. However, if the inference model determines that the data includes the data attributes such as a low level of importance, a low frequency of accessing the data, a high volume of data, etc. then the inference model may store the data in the cloud storage.

In another instance, the inference model may determine that the data access request is a read request. If the data access request is a read request, the inference model may perform a search for the data. To perform the search for the data, a storage allocation table may be accessed by the inference model in the data manager, file system and/or the API of the any number of data processing system 100A-100N. The storage allocation table may be used to find a location in the local storage of at least one block of storage that belongs to the data.

The at least one block of the storage may be stored in the location in the local storage. From the at least one block of the storage, the data may be retrieved by the inference model. Upon retrieval of the data, the inference model may transfer, using the API and/or the file system, the data to the application for performance of at least one operation by the application.

The at least one block of the storage in the location in the local storage may include metadata that is stored in place of the data. The metadata may include a storage location, specified by a pointer. The pointer may point to a storage location in the cloud storage. The inference model may ingest the pointer and access the location in the cloud storage. Upon accessing the location in the cloud storage, the inference model may perform a read of the at least one block of the storage to retrieve the data. Upon retrieval of the data, the inference model may transfer, using the API and/or the file system, the data to the application for performance of at least one operation by the application.

Management system 104 may include the cloud storage. The cloud storage may store the data that includes the data access patterns such as a low level of importance, a low frequency of accessing the data, a high volume of data, etc. Management system 104 may be accessed by the inference model as a result of a data access request by an application of the any number of data processing system 100A-100N.

To be able to perform the data access request, the inference model may be trained. The inference model may be trained by management system 104. The inference model may be trained using data access patterns of data. The data access patterns of the data may be stored on management system 104. The inference model may be trained by ingesting, by the inference model, the data access patterns of the data to determine the storage location to write at least one portion of the data in the data set. The inference model may include a decision tree, neural network, support vector machine, etc.

The data access patterns may include data usage patterns, data characteristics, data priorities, etc. The data usage patterns may include a frequency of accessing the data, at least one time at which the accessing the data occurs, latency associated with the accessing of the data, etc. The data characteristics may include at least a type of the data, a volume of the data, and/or at least one security protocol by which to secure the data. The data priorities may categorize at least one level of importance of the data associated with an operation by the data processing system. While providing their functionality, any of deployment 100 and management system 104 may perform all, or a portion, of the flows and methods shown in FIGS. 2A-3C.

Any of (and/or components thereof) deployment 100 and management system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

Figure 2A:
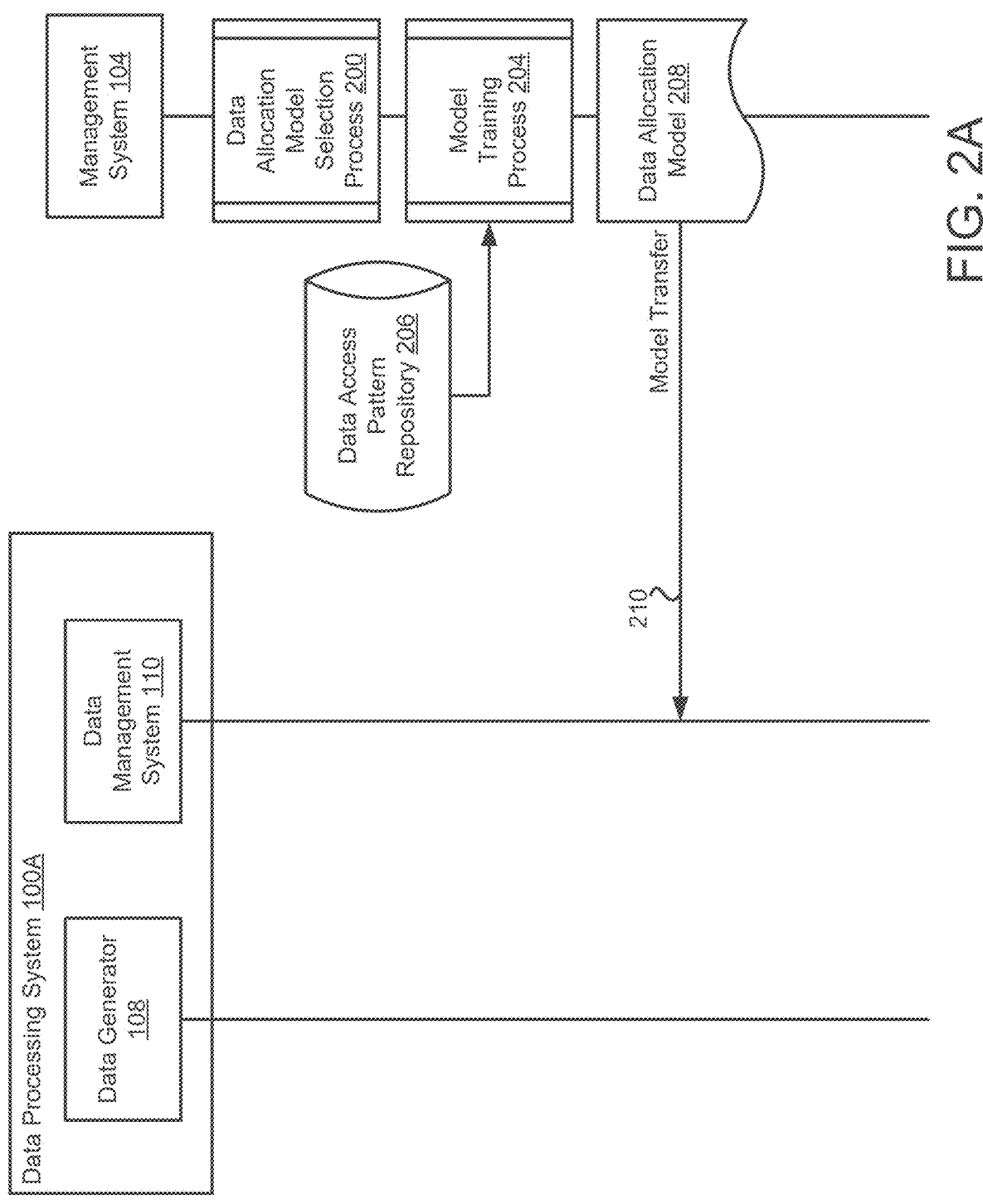
FIGS. 2A-2C show interaction diagrams illustrating operation of a system in accordance with an embodiment.
Figure 2B:
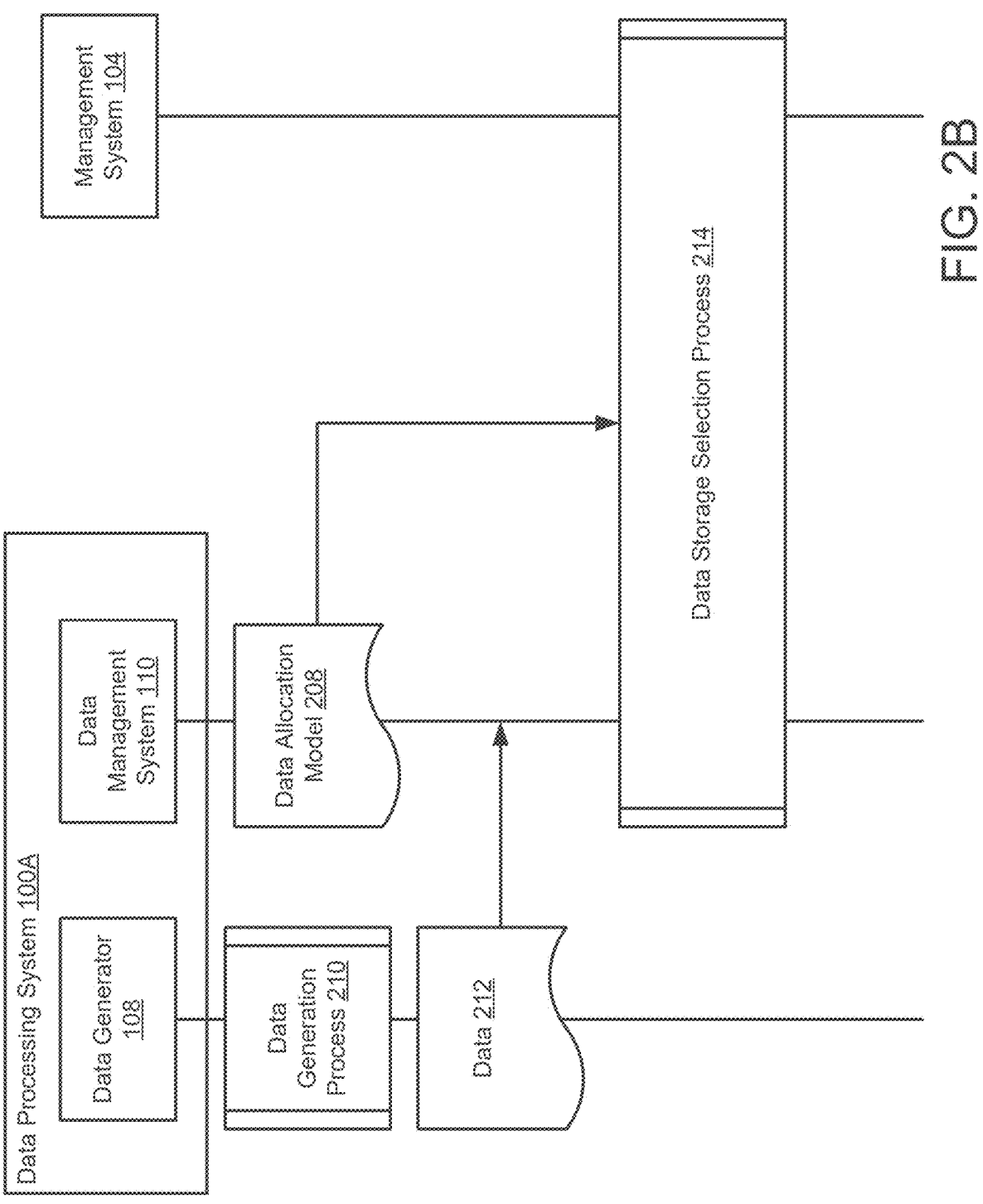
Figure 2C:
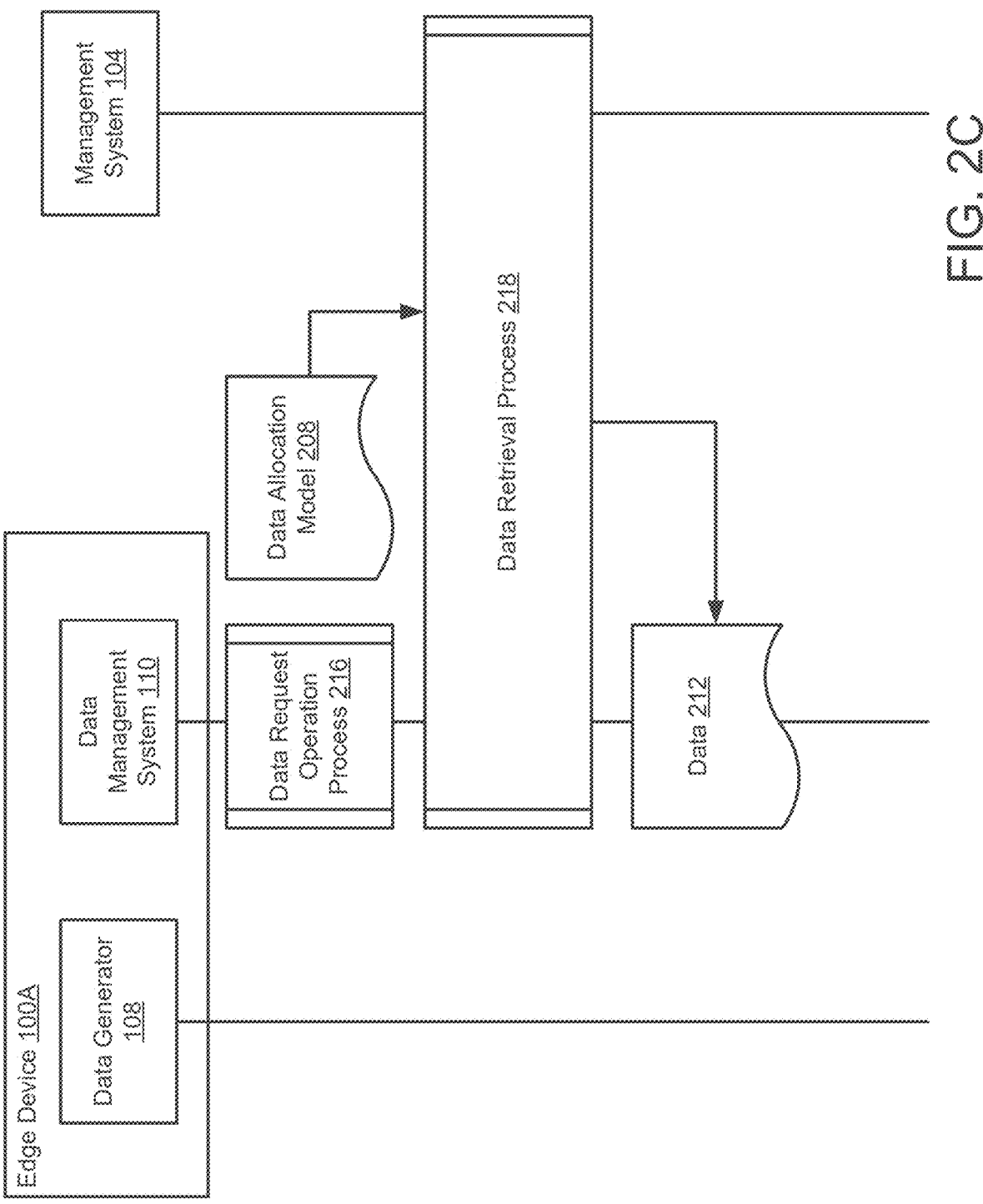

To further clarify embodiments disclosed herein, interactions diagrams in accordance with an embodiment are shown in FIGS. 2A-2C. These interactions diagrams may illustrate how data may be obtained and used within the system of FIGS. 2A-2C.

In the interaction diagrams, processes performed by and interactions between components of a system in accordance with an embodiment are shown. In the diagrams, components of the system are illustrated using a first set of shapes (e.g., 100A, 104, etc.), located towards the top of each figure. Lines descend from these shapes. Processes performed by the components of the system are illustrated using a second set of shapes (e.g., 200, 204, etc.) superimposed over these lines. Interactions (e.g., communication, data transmissions, etc.) between the components of the system are illustrated using a third set of shapes (e.g., 210, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the process labeled as 200 may occur prior to the process labeled as 204. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate data used in and data processing performed in training of a data allocation model.

To train the data allocation model, data allocation model selection process 200 may be performed. During data allocation model selection process 200, an inference model may be selected. The inference model may be an artificial intelligence model. The type of inference model may include a decision tree, neural network, support vector machine, etc. The inference model may be ingested in model training process 204.

During model training process 204, the inference model may be trained to obtain a data allocation model. The inference model may be trained by ingesting, by the inference model, at least a portion of data access patterns of data access pattern repository 206. Data access pattern repository 206 may include data access patterns of various types of data. The data access patterns may include data usage patterns, data characteristics, data priorities, etc. The data usage patterns may include a frequency of accessing the data, at least one time at which the accessing the data occurs, latency associated with the accessing of the data, etc. The data characteristics may include a type of the data, a volume of the data, and/or at least one security protocol by which to secure the data. The data priorities may categorize at least one level of importance of the data associated with an operation by the data processing system.

At least a portion of the data access patterns may be ingested by the inference model during optimization of the inference model. The inference model may be evaluated by ingesting, by the inference model, at least a second portion of the data access patterns to generate at least one prediction of a storage location for data of the at least a second portion of the data access patterns. The inference model may be optimized further by modifying at least one hyperparameter (e.g., learning rate, number of epochs, choice of activation function, etc.). After optimizing at least one hyperparameter and evaluating the inference model using a third portion of the data access patterns, data allocation model 208 may be obtained.

Data allocation model 208 may be trained to receive data and, based on the data access patterns of the data, select a storage location for the data. Data allocation model 208 may select a storage location by (i) receiving the data, (ii) performing a search for metadata of the data to find the data access patterns, (iii) ingesting the data access patterns, and (iv) selecting the storage location for the data. The metadata may include data access patterns of the data, including (i) access frequency, (ii) security protocols, (iii) data volume, (iv) data type, (v) data modification history and frequency, etc.

Finally, data allocation model 208 may be deployed from management system 104 to data management system 110 of data processing system 100A. Data allocation model 208 may be deployed by transferring, by management system 104, data allocation model 208 (e.g. 210) to data management system 110. Data allocation model 208 may be transferred by shared memory, a data stream, socket communication, etc.

Thus, via the interaction illustrated in FIG. 2A, a system in accordance with an embodiment may train the data allocation model. Consequently, a deployment (e.g., 100) may be more likely to be able to provide desired computer implemented services by generating an artificial intelligence model that selects the storage location for the data based on the data access patterns of the data.

Turning to FIG. 2B, a second interaction diagram in accordance with an embodiment is shown. The second interaction diagram may illustrate data used in and data processing performed in selecting, by a data allocation model, a storage location of data to write the data in the storage location.

To select the storage location, data generation process 210 may be performed. During data generation process 210, data 212 may be generated by creating, by an application, a data structure from information taken from an input of the application and/or a process of the application. The input of the application may include user input, such as (i) a user click of a mouse button and/or a keyboard key, (ii) a data file that a user opens with the application, and (iii) a data structure that is created by the user using the application, etc. The process of an application may include (i) monitoring and/or logging of at least one event while the application runs on data processing system 100A, (ii) a transaction in which at least a first data structure is ingested and is used to generate at least a second data structure (e.g., database queries, syntax parsing, geospatial data processing, etc.).

As a result, data 212 may be generated. Data 212 may include data types such as (i) a document, (ii) an image, (iii) an audio file, (iv) a video file, (v) an e-mail, (vi) a database record, (vii) log file, (viii) a digital transaction (e.g., e-commerce), etc. Each of the data types may include metadata. For example, the metadata of the log file may include (i) a timestamp, (ii) a log level (information, error, warning, etc.), (iii) a session identification, etc. As another example, the metadata of the document may include (i) a creation date, (ii) an access frequency, (iii) permissions, (iv) a last modified date, etc.

Data 212 may be ingested by data storage selection process 214 to select the storage location of data 212. During data storage selection process 214, data 212 may be passed, for example, by an application that generated data 212, from data generator 108 to data management system 110. Data 212 may be passed by shared memory, a data stream, socket communication, etc.

Data management system 110 may receive data 212. On receiving data 212, a data access request may be obtained by data management system 110. The data access request may be obtained by receiving a notification from the application for a write request of data 212. To perform a write of data 212 of the data access request, data management system 110 may extract data access patterns of data 212.

Data management system 110 may extract the data access patterns by performing, using data 212, an application programming interface (API) call. Depending on a data type of data 212 (e.g., the document, the image, the audio file, the video file, etc.), at least one type of API call may be used to parse the metadata from data 212. The API call may include at least one function call that is appropriate for extracting the metadata from the data type of data 212.

Once the data access patterns have been extracted, data allocation model 208 may ingest the data access patterns to generate the storage location. The storage location may be generated by determining, by data allocation model 208, an appropriate location (e.g., local storage on data processing system 100A, cloud storage on management system 104, etc.) using the data access patterns.

For example, if data allocation model 208 determines that data 212 includes the data access patterns such as (i) a high level of importance (e.g., a "critical" and/or "high priority" tag may be stored in the data access patterns, etc.), (ii) a large number of reads and/or writes, (iii) a low volume of data (e.g., a low volume compared to a capacity for storage by the local storage of data processing system 100A, etc.), etc., then data allocation model 208 may store the data 212 in the local storage of data processing system 100A. However, if data allocation model 208 determines that data 212 includes the data access patterns such as (i) a low level of importance (e.g., a "critical" and/or "high priority" tag may not be stored in the data access patterns, etc.), (ii) a small number of the reads and/or the writes, (iii) a high volume of data (e.g., a high volume compared to the capacity for the storage by the local storage of data processing system 100A, etc.), etc., then data allocation model 208 may store data 212 in the cloud storage of management system 104.

Thus, via the interaction illustrated in FIG. 2B, a system in accordance with an embodiment may select, by the data allocation model, the storage location of data to write the data in the storage location. Consequently, a deployment (e.g., 100) may be more likely to be able to provide desired computer implemented services by determining the storage location for the data based on data access patterns from metadata of the data.

Turning to FIG. 2C, a third interaction diagram in accordance with an embodiment is shown. The third interaction diagram may illustrate data used in and data processing performed in selecting, by a data allocation model, a storage location of data to perform a read of the data.

To select the storage location, data request operation process 216 may be performed. During data request operation process 216, a data access request may be obtained by data management system 110. The data access request may be obtained by receiving a notification from an application for a read request of data 212, illustrated in FIG. 2B.

To perform a read of data 212 of the data access request, data retrieval process 218 may be performed. During data retrieval process 218, data management system 110 may ingest data attributes of the data access request. Data management system 110 may ingest data attributes by extracting details of the write request from the data access request. The details of the write request may include (i) a data type of data 212, (ii) a file name of data 212, (iii) a command to perform a write, (iv) a first location in local storage of data processing system 100A to search for data 212, etc. The first location may also be found by performing, by data management system 110, a search of a storage allocation table of data processing system 100A.

Using the first location in the local storage of data processing system 100A, data allocation model 208 may perform a search of the local storage for data 212. If data 212 is found in the local storage, then data allocation model 208 may obtain data 212 and transfer data 212 to the application in data management system 110. Otherwise, if data 212 is not found in the local storage and no other data relating to data 212 is found, then the search by data allocation model 208 may end.

However, if metadata of data 212 is found by data allocation model 208, then data allocation model 208 may perform a second search within the metadata. Data allocation model 208 may perform a second search to find a pointer that identifies the storage location of data 212. The pointer may identify the storage location of data 212, for example, as cloud storage of management system 104.

Data allocation model 208 may then perform a third search in the cloud storage of management system 104 as identified by the pointer in the metadata of data 212. As a result of the third search, data allocation model 208 may copy data 212 from the cloud storage and populate the local storage of data processing system 100A with data 212. Further, data allocation model 208 may transfer data 212 from the local storage to the application in data management system 110.

Thus, via the interaction illustrated in FIG. 2C, a system in accordance with an embodiment may select, by the data allocation model, the storage location of the data to perform a read of the data. Consequently, a deployment (e.g., 100) may be more likely to be able to provide desired computer implemented services by determining the storage location for the data based on at least the metadata of the data.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
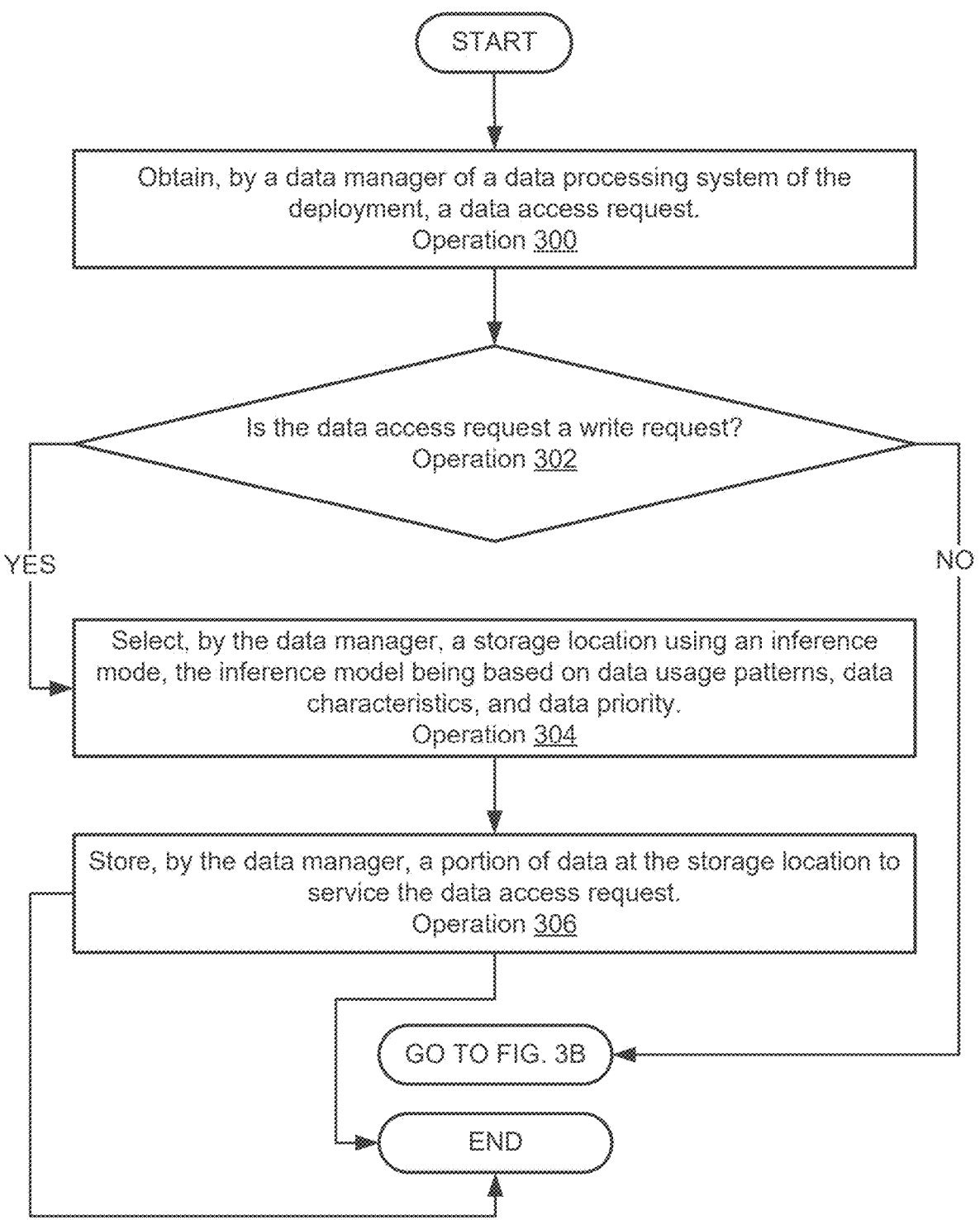
FIGS. 3A-3C show flow diagrams illustrating a method in accordance with an embodiment.
Figure 3B:
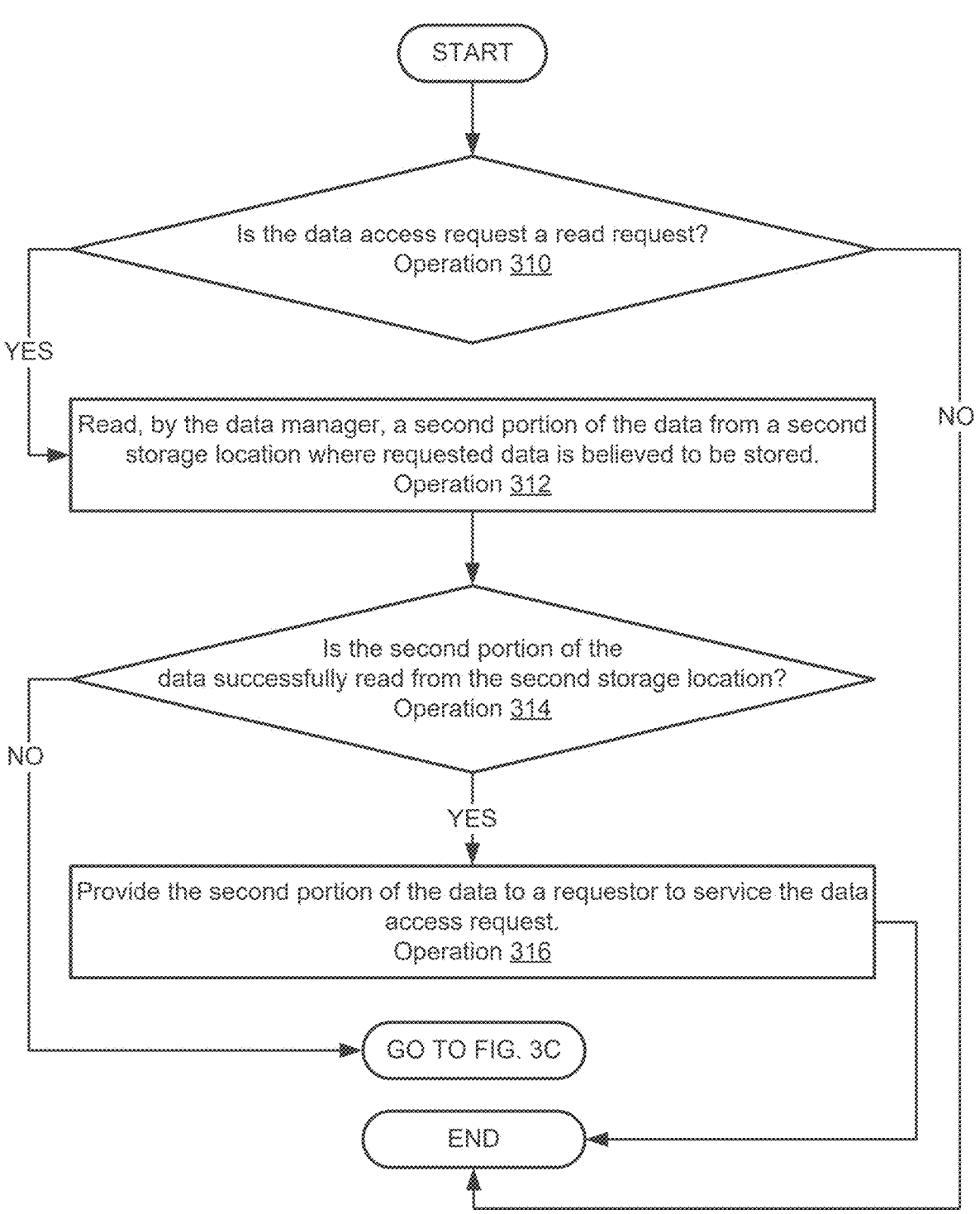
Figure 3C:
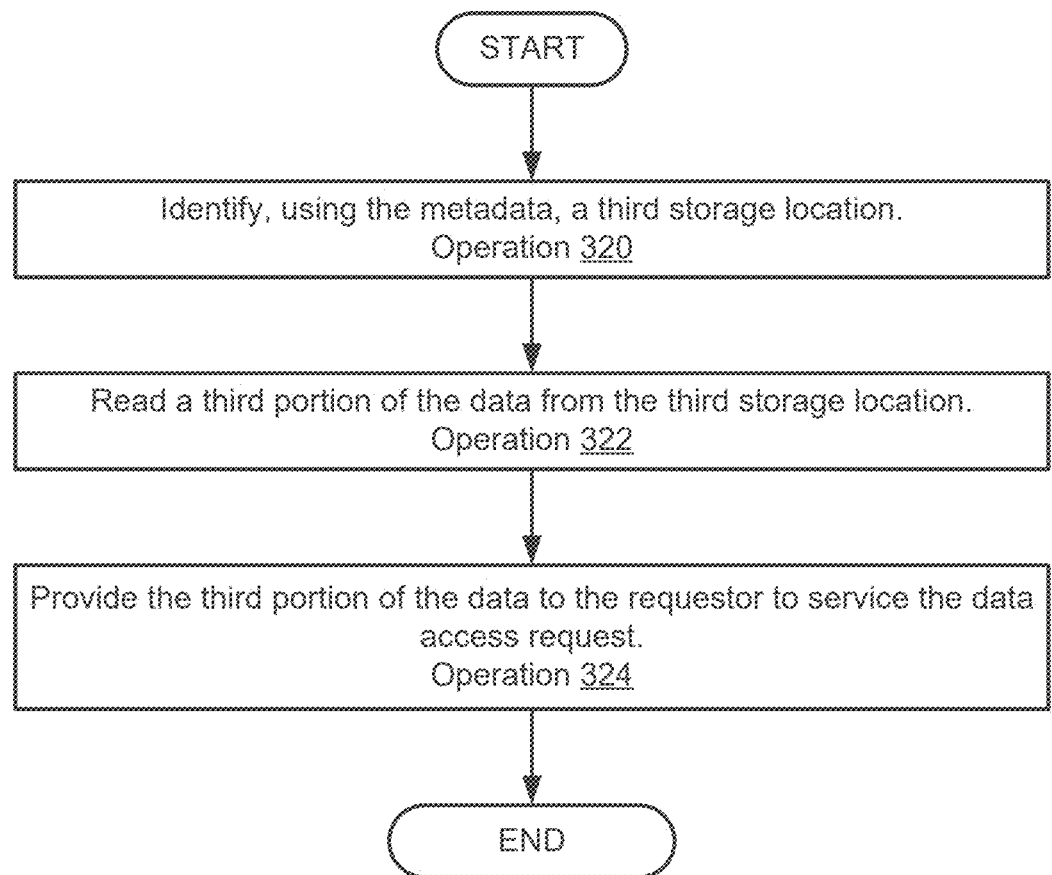

As discussed above, the components of FIG. 1 may perform various methods to manage an operation of a deployment. FIGS. 3A-3C illustrate a method that may be performed by the components of the system of FIG. 1. In the diagram discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of managing the operation of the deployment in accordance with an embodiment is shown. The method may be performed, for example, by any of the components of the system of FIG. 1, and/or other components not shown therein.

At operation 300, a data access request may be obtained by a data manager of a data processing system of the deployment. The data access request may be obtained by receiving the data access request from an application.

At operation 302, a determination may be made whether the data access request is a write request. The determination may be made, by the data manager, by screening the data access request for an indication in the data access request that specifies the write request. The write request may be specified by at least one label and/or tag having a value of insert, update, etc.

If the data access request is the write request, then the method may continue at operation 304. Otherwise, if the data access request is not the write request, then the method may continue in FIG. 3B.

Continuing from operation 302, at operation 304, a storage location may be selected, by the data manager, using an inference model, the inference model being based on data usage patterns, data characteristics, and/or data priority. A storage location may be selected by (i) predicting, using the inference model, a quantity of computing resources likely to be used in the future for accessing, by the data processing system, the portion of the data in the future; (ii) comparing the quantity to a threshold quantity; (iii) selecting local storage for storage of the portion of the data, in a first instance of the comparing where the quantity exceeds the threshold quantity; and (iv) selecting remote storage for storage of the portion of the data, in a second instance of the comparing where the quantity does not exceed the threshold quantity.

A quantity of computing resources may be predicted, using the inference model, by (i) ingesting the metadata from the portion of the data, the metadata including (a) access frequency, (b) input/output load, (c) security methods used by the portion of the data, etc. and (ii) performing an analysis using the metadata to predict the quantity of the computing resources. The quantity may be compared to a threshold quantity by (i) computing, by the inference model, a difference in the quantity and the threshold quantity, and (ii) determining if the difference is a negative, positive, and/or null value. The local storage may be selected by performing, by the inference model, a first operation of storing the portion of the data based on the selection made by the inference model. The remote storage may be selected by performing, by the inference model, an second operation of storing the portion of the data based on the selection made by the inference model.

At operation 306, the portion of the data may be stored, by the data manager, to service the access request. The portion of the data may be stored by writing at least one block of the portion of the data to a disk and/or persistent storage.

The method may end following operation 306.

Continuing from operation 302, turning to FIG. 3B, at operation 310, a determination may need to be made whether the data access request is a read request. The determination may be made, by the data manager, by screening the data access request for the indication in the data access request that specifies the read request. The read request may be specified by at least one label and/or tag having a value of select, get, etc.

If the data access request is the read request, then the method may continue at operation 312. Otherwise, if the data access request is not the write request, then the method may end following operation 310.

From operation 310, at operation 312, a second portion of the data may be read, by the data manager, from a second storage location where the requested data is believed to be stored. The second portion of the data may be read by performing an extraction of the second portion of the data from the disk and/or persistent storage of the second storage location.

At operation 314, a determination may made whether the second portion of the data successfully read from the second storage location. The determination may be made by (i) confirming that no errors were received during the read of the second portion of the data and/or (ii) receiving a status code that indicates a successful read of the second portion of the data.

If the second portion of the data successfully is read from the second storage location, then the method may continue at operation 316. Otherwise, if metadata of the second portion of the data is successfully read from the second storage location, then the method may continue in FIG. 3C.

At operation 316, the second portion of the data may be provided to a requestor to service the data access request. The second portion of the data may be provided by transferring, by the data manager, the second portion of the data to the application that submitted the data access request.

The method may end following operation 316.

From operation 314, turning to FIG. 3C, at operation 320, a third storage location may be identified using the metadata. The third storage location may be identified (i) reading the metadata of a third portion of the data, (ii) performing a search for a pointer in the metadata that points to the third storage location, and/or (iii) identifying, based on the pointer, the third storage location.

At operation 322, the third portion of the data may be read from the third storage location. The third portion of the data may be read by performing the extraction of the third portion of the data from the disk and/or persistent storage of the third storage location.

At operation 324, the third portion of the data may be provided to the requestor to service the data access request. The third portion of the data may be provided by transferring, by the data manager, the third portion of the data to the application that submitted the data access request.

The method may end following operation 324.

Thus, via the method shown in FIGS. 3A-3C, embodiments herein may likely improve a likelihood of managing the operation of the deployment. By improving the likelihood of managing the operation of the deployment, the data processing systems may be more likely to provide desirable computer implemented services by, for example, performing a selection of the storage location to perform the write request based on data access patterns of the portion of the data, performing the read request by using at least one value of the metadata of the third portion of the data to determine the third storage location in which to perform the read request, etc.

Figure 4:
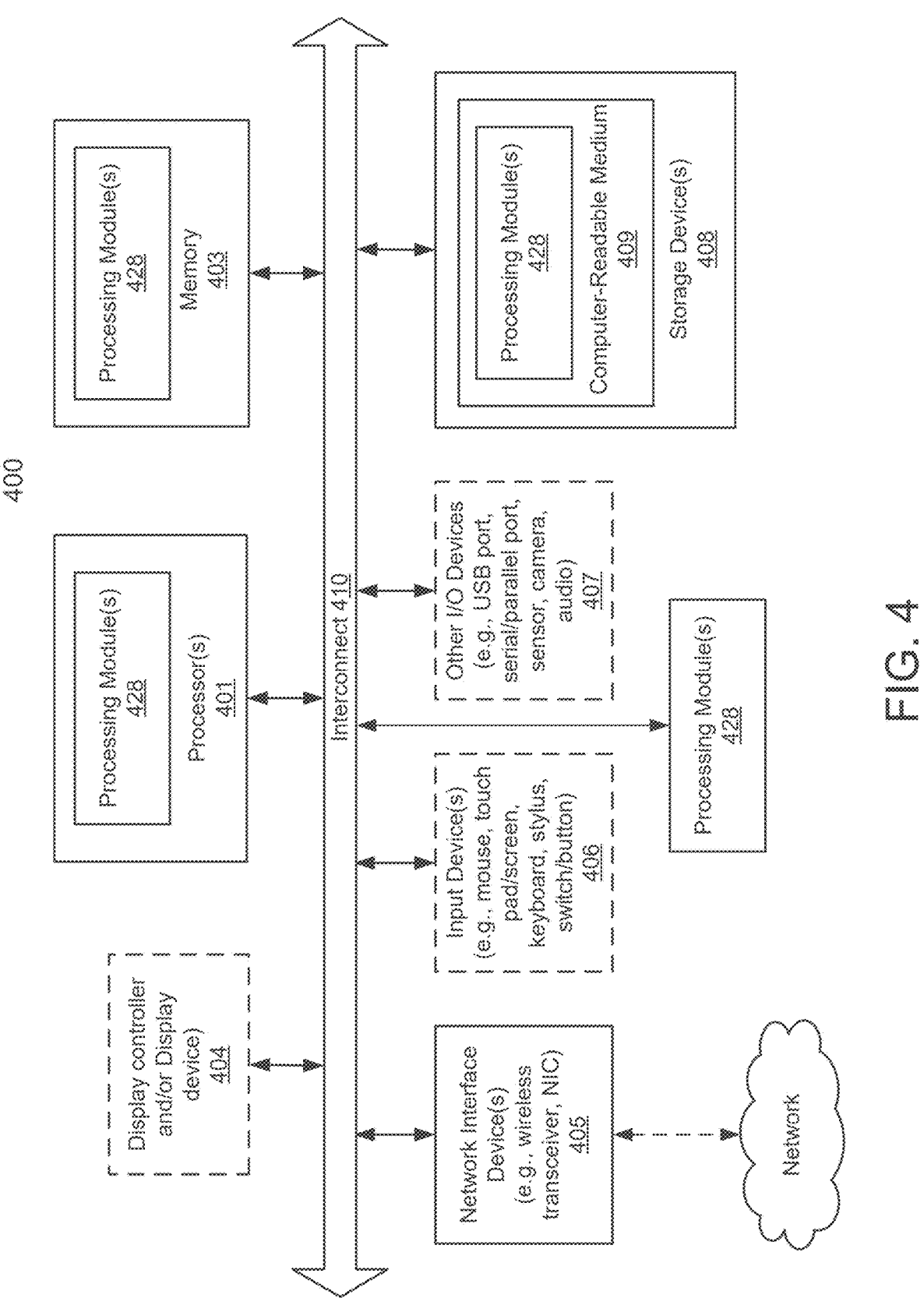
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic

428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a deployment, the method comprising:

obtaining, by a data manager of a data processing system of the deployment, a data access request;

in a first instance of the obtaining where the data access request is a write request:

selecting, by the data manager, a storage location using an inference model, the inference model being based on data usage patterns, data characteristics, and data priority;

storing, by the data manager, a portion of data at the storage location to service the data access request;

in a second instance of the obtaining where the data access request is a read request:

reading, by the data manager, a second portion of the data from a second storage location where requested data is believed to be stored;

in a first instance of the reading where the second portion of the data is successfully read from the second storage location:

providing the second portion of the data to a requestor to service the data access request;

in a second instance of the reading where the second portion of the data where metadata is read from the second storage location:

identifying, using the metadata, a third storage location;

reading a third portion of the data from the third storage location; and providing the third portion of the data to the requestor to service the data access request.

2. The method of claim 1, wherein the data usage patterns comprise a frequency of accessing the data, at least one time at which the accessing the data occurs, and latency associated with the accessing of the data.

3. The method of claim 1, wherein the data characteristics comprise a type of the data, a volume of the data, and at least one security protocol by which to secure the data.

4. The method of claim 1, wherein the data priority categorizes a level of importance of the data associated with an operation by the data processing system.

5. The method of claim 1, wherein the metadata of the data comprises at least a storage location of the data.

6. The method of claim 5, wherein the metadata is stored in a physical block address space of a data storage device that is reserved for the data, the data is not stored in the physical block address space, and performing a read of the physical block address space returns the metadata and not the data.

7. The method of claim 1, wherein selecting, by the data manager, the storage location using the inference model comprises:

predicting, using the inference model, a quantity of computing resources likely to be used at a future time for accessing, by the data processing system, the portion of the data at the future time;

comparing the quantity to a threshold quantity;

in a first instance of the comparing where the quantity exceeds the threshold quantity:

selecting local storage for storage of the portion of the data; and in a second instance of the comparing where the quantity does not exceed the threshold quantity:

selecting remote storage for storage of the portion of the data.

8. A non-transitory machine-readable medium having instructions stored therein, which when executed by a processor, cause the processor to perform operations for managing operation of a deployment, the operations comprising:

obtaining, by a data manager of a data processing system of the deployment, a data access request;

in a first instance of the obtaining where the data access request is a write request:

selecting, by the data manager, a storage location using an inference model, the inference model being based on data usage patterns, data characteristics, and data priority;

storing, by the data manager, a portion of data at the storage location to service the data access request;

in a second instance of the obtaining where the data access request is a read request:

reading, by the data manager, a second portion of the data from a second storage location where requested data is believed to be stored;

in a first instance of the reading where the second portion of the data is successfully read from the second storage location:

providing the second portion of the data to a requestor to service the data access request;

in a second instance of the reading where the second portion of the data where metadata is read from the second storage location:

identifying, using the metadata, a third storage location;

reading a third portion of the data from the third storage location; and providing the third portion of the data to the requestor to service the data access request.

9. The non-transitory machine-readable medium of claim 8, wherein the data usage patterns comprise a frequency of accessing the data, at least one time at which the accessing the data occurs, and latency associated with the accessing of the data.

10. The non-transitory machine-readable medium of claim 8, wherein the data characteristics comprise a type of the data, a volume of the data, and at least one security protocol by which to secure the data.

11. The non-transitory machine-readable medium of claim 8, wherein the data priority categorizes a level of importance of the data associated with an operation by the data processing system.

12. The non-transitory machine-readable medium of claim 8, wherein the metadata of the data comprises at least a storage location of the data.

13. The non-transitory machine-readable medium of claim 12, wherein the metadata is stored in a physical block address space of a data storage device that is reserved for the data, the data is not stored in the physical block address space, and performing a read of the physical block address space returns the metadata and not the data.

14. The non-transitory machine-readable medium of claim 8, wherein selecting, by the data manager, the storage location using the inference model comprises:

predicting, using the inference model, a quantity of computing resources likely to be used at a future time for accessing, by the data processing system, the portion of the data at the future time;

comparing the quantity to a threshold quantity;

in a first instance of the comparing where the quantity exceeds the threshold quantity:

selecting local storage for storage of the portion of the data; and in a second instance of the comparing where the quantity does not exceed the threshold quantity:

selecting remote storage for storage of the portion of the data.

15. A data processing system, comprising:

a processor; and a memory coupled to the processor to store instructions, which when executed by the processor, cause the processor to perform operations managing operation of a deployment, the operations comprising:

obtaining, by a data manager of the data processing system of the deployment, a data access request;

in a first instance of the obtaining where the data access request is a write request:

selecting, by the data manager, a storage location using an inference model, the inference model being based on data usage patterns, data characteristics, and data priority;

storing, by the data manager, a portion of data at the storage location to service the data access request;

in a second instance of the obtaining where the data access request is a read request:

reading, by the data manager, a second portion of the data from a second storage location where requested data is believed to be stored;

in a first instance of the reading where the second portion of the data is successfully read from the second storage location:

providing the second portion of the data to a requestor to service the data access request;

in a second instance of the reading where the second portion of the data where metadata is read from the second storage location:

identifying, using the metadata, a third storage location;

reading a third portion of the data from the third storage location; and providing the third portion of the data to the requestor to service the data access request.

16. The data processing system of claim 15, wherein the data usage patterns comprise a frequency of accessing the data, at least one time at which the accessing the data occurs, and latency associated with the accessing of the data.

17. The data processing system of claim 15, wherein the data characteristics comprise a type of the data, a volume of the data, and at least one security protocol by which to secure the data.

18. The data processing system of claim 15, wherein the data priority categorizes a level of importance of the data associated with an operation by the data processing system.

19. The data processing system of claim 15, wherein the metadata of the data comprises at least a storage location of the data.

20. The data processing system of claim 19, wherein the metadata is stored in a physical block address space of a data storage device that is reserved for the data, the data is not stored in the physical block address space, and performing a read of the physical block address space returns the metadata and not the data.

\* \* \* \* \*